US005669015A

United States Patent [19]
Chidester et al.

[11] Patent Number: 5,669,015
[45] Date of Patent: Sep. 16, 1997

[54] SYSTEM FOR SELECTIVELY COUPLING TRACKBALL AND MOUSE THROUGH A SWITCH WHERE INPUT DEVICE PROVIDES CODED SIGNAL TO DISABLE TRACKBALL WHILE PERMITTING SIGNALS FROM MOUSE

[75] Inventors: Philip D. Chidester, Austin; Martin Melendez, Pflugerville, both of Tex.

[73] Assignee: Dell USA L.P., Austin, Tex.

[21] Appl. No.: 279,733

[22] Filed: Jul. 25, 1994

[51] Int. Cl.$^6$ .................................. G06F 13/00
[52] U.S. Cl. .................. 395/893; 395/858; 395/828; 395/733
[58] Field of Search ............... 340/825.03, 825.5; 365/234, 236.8, 238.1, 241.9

[56] References Cited

U.S. PATENT DOCUMENTS

| | | | |
|---|---|---|---|
| 4,313,160 | 1/1982 | Kaufman et al. | 395/843 |
| 4,627,035 | 12/1986 | Yashiro | 365/230 |
| 4,692,862 | 9/1987 | Cousin et al. | 364/200 |
| 5,097,506 | 3/1992 | Kaiser, Jr. et al. | 380/25 |
| 5,182,465 | 1/1993 | Stanley | 307/115 |
| 5,237,692 | 8/1993 | Raasch et al. | 395/725 |
| 5,333,273 | 7/1994 | Raasch et al. | 395/275 |
| 5,434,562 | 7/1995 | Reardon | 340/825.34 |
| 5,446,906 | 8/1995 | Kardach et al. | 395/750 |
| 5,448,697 | 9/1995 | Parks et al. | 395/162 |
| 5,465,083 | 11/1995 | Okamoto | 340/825.31 |

*Primary Examiner*—Thomas C. Lee
*Assistant Examiner*—Anderson I. Chen
*Attorney, Agent, or Firm*—Conley, Rose & Tayon, P.C.; Michael F. Heim

[57] ABSTRACT

A trackball enable/disable system is disclosed for use in a personal computer to permit selective activation and deactivation of a trackball or mouse device. The system includes a keyboard controller that detects the selection of a hot key (or combination of keys) by the operator, and in response either enables or disables the trackball. In one embodiment, the controller includes an associated flag, and sets or reset a the flag in response to hot key selection. Signals from the trackball are received by the keyboard controller and assembled in preparation for transmission to the CPU. Before the trackball data is transmitted to the CPU, the status of the flag is checked to determine if the trackball is enabled or disabled. If disabled, the trackball data is not sent to the CPU. In an alternative embodiment, a pair of switches are provided between the trackball and the controller. If the hot key is selected, the keyboard controller connects or disconnects the trackball by an appropriate control signal to the switches on a control line.

23 Claims, 5 Drawing Sheets

SYSTEM FOR SELECTIVELY COUPLING TRACKBALL AND MOUSE THROUGH A SWITCH WHERE INPUT DEVICE PROVIDES CODED SIGNAL TO DISABLE TRACKBALL WHILE PERMITTING SIGNALS FROM MOUSE

BACKGROUND OF THE INVENTION

The present invention relates generally to an input device for a portable personal computer ("PC"). More particularly, this invention relates to a trackball or mouse device that is used to provide input signals to control a pointer or arrow on the screen of a PC. Still more particularly, this invention relates to system for selectively enabling or disabling a trackball device during operation.

The trend in the portable PC market is for smaller and lighter computers that can easily be carried and stored by a user. Consumers of portable PC's, however, also are demanding more computing power and additional features that rival traditional desk-top computers. Thus, to satisfy consumers, portable PC manufacturers are providing more computing power, with additional features, on more compact units.

One of the features that is especially desired on computers is a trackball or mouse device, which can facilitate the use of certain operating systems and software programs. To minimize the number of accessories that must be carried with the portable computer, and also to minimize the number of external connections, certain portable computer manufacturers provide an integral trackball device adjacent the keyboard of the personal computer, as shown for example in FIG. 1. Because of the space restrictions on the more compact computers, the trackball in some of these computers is located next to the space bar, in the region where the user may tend to rest his or her hands during keyboard operation.

Providing a trackball adjacent the keyboard, however, increases the possibility of operator errors. Because of the proximity of the trackball to the keyboard, a user may inadvertently activate the trackball while using the keyboard. In certain operating systems or software programs, this inadvertent activation of the trackball can have disastrous results. In word processing programs, for example, activating the trackball may initiate text blocking features. If a delete key is subsequently activated, the text could be erased accidently.

Typically, the trackball is activated during system initialization or "boot-up." Thus, if the trackball is disabled by the user, the only way to enable the trackball is to reboot the system. In addition, the trackball must be activated before most software packages or operating systems are initiated. As a result of these operating parameters, typically the trackball is left enabled during operation with the hope that no operator errors will result.

It would be desirable to develop a system in which the trackball can be selectively enabled or disabled at any time through the selection of a "hot" key or key combination. Although the advantages of such a feature are apparent, to date no one has developed a system that can quickly enable and disable a trackball during system operation.

SUMMARY OF THE INVENTION

The present invention solves the shortcomings and deficiencies of the prior art by providing a system in which a keyboard controller disables the trackball based upon the selection of a suitable "hot" key or key combination by an operator. The keyboard controller connects between the keyboard and a central processing unit ("CPU") and functions to convert signals from the keyboard to data signals that then are assembled and transmitted to the CPU. The keyboard controller also may connect to the trackball through a pair of bi-directional lines to receive data signals from the trackball.

In one embodiment, the keyboard controller discards output signals from the trackball upon the selection of the hot key. In this embodiment, the keyboard controller sets a flag in response to the selection of the hot key, and then checks the status of the flag before transmitting trackball data signals to the central processing unit. If the trackball has been disabled by selection of the hot key, then the keyboard controller discards the trackball data.

Alternatively, a switch is provided for the bi-directional lines between the trackball and keyboard controller. The switch connects to an external mouse connector and receives a control signal from the keyboard controller. The keyboard controller, in response to the selection of the hot key, toggles the state of the control signal to switch, thereby connecting the keyboard controller to the external mouse connector and effectively blocking the input signals from the trackball.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
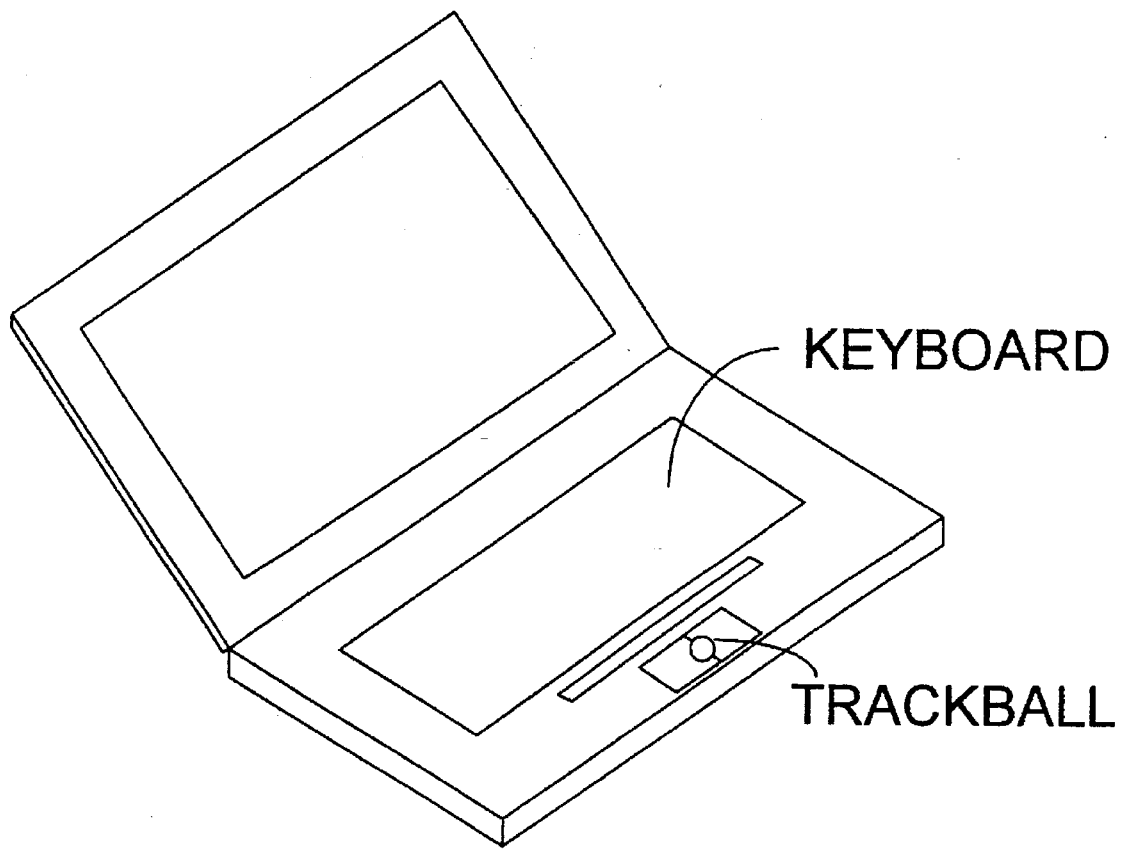
FIG. 1 depicts a keyboard arrangement of an exemplary portable personal computer with an integral trackball device.
Figure 2:
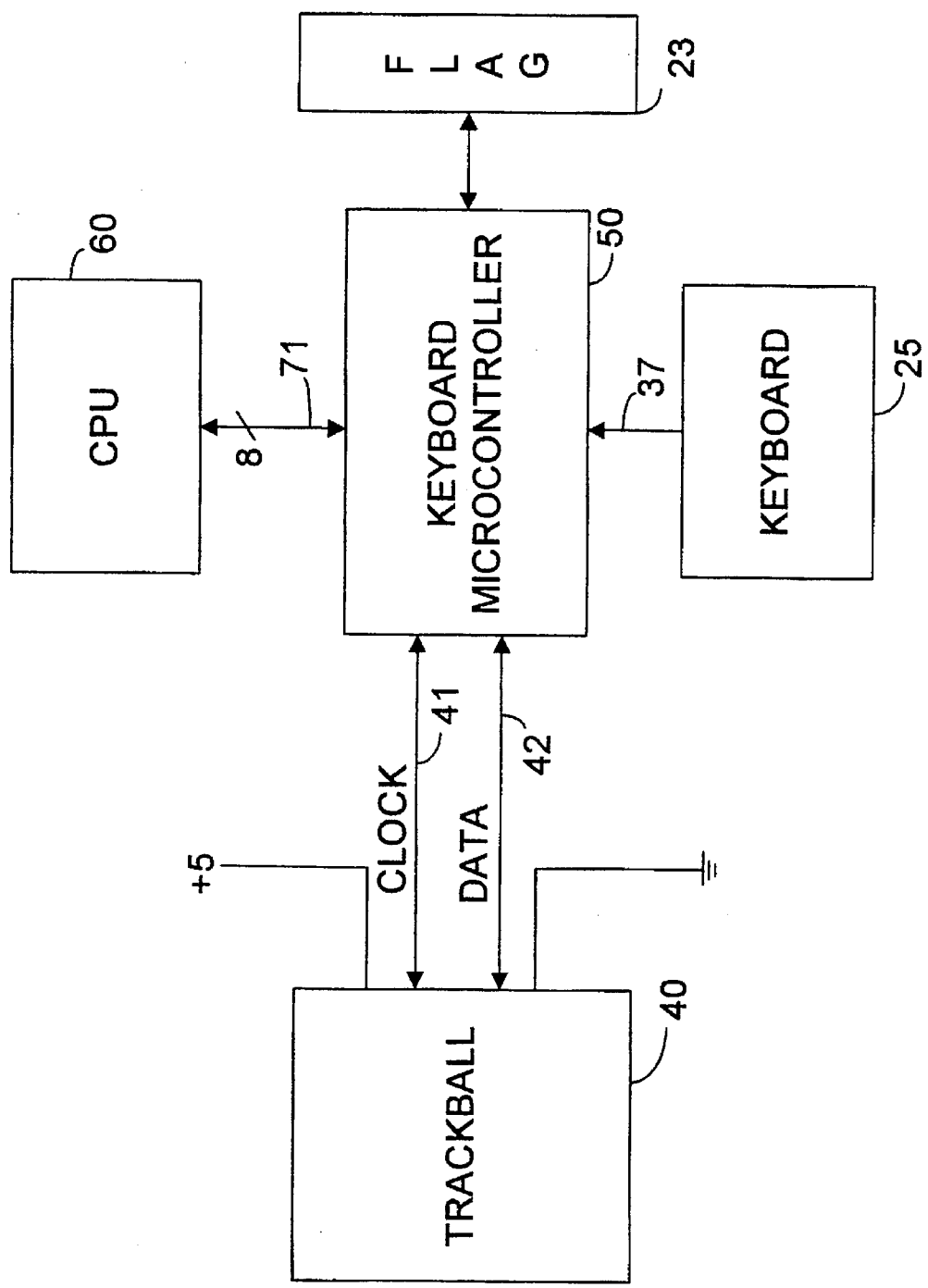
FIG. 2 is a schematic illustration of the system constructed in accordance with the preferred embodiment of,the present invention.

Referring now to FIG. 2, the present invention constructed in accordance with the preferred embodiment generally comprises a keyboard controller 50, a keyboard 25, a trackball 40, and a central processing unit ("CPU") 60. The CPU 60 may comprise any suitable microprocessor, including for example an INTEL 80486® microprocessor. The selection of the CPU 60 is not critical to the operation of the present invention, except that the CPU 60 preferably is compatible with the keyboard controller 50.

In accordance with normal convention, the keyboard controller 50 preferably comprises an INTEL 8051® microcontroller that connects to the CPU 60 through an eight bit data bus 71. In addition, the keyboard controller 50 connects to the keyboard 25 through a suitable connection 37 for receiving serial data signals therefrom. The keyboard controller 50 connects to the trackball 40 through a mouse clock line 41 and mouse data line 42. In the preferred embodiment of FIG. 2, the keyboard controller 50 includes an associated flag, shown as FLAG 23 in FIG. 2. As one skilled in the art will understand, the flag may comprise a space in memory or a bit in a register. The flag, however configured, denotes whether the trackball 40 has been enabled or disabled by the selection of a "hot" key on the keyboard 25. The keyboard controller 50 preferably is programmed according to the flow charts of FIGS. 3A and 3B to implement the present invention.

The trackball 40 preferably is provided adjacent keyboard 25 as part of a portable computer. As one skilled in the art will understand, the present invention may also be used on desk-top computers to reduce the possibility of operator errors caused by unintentionally activating a mouse, or to permit an operator to selectively enable and/or disable the mouse during operation. The trackball 40 preferably includes at least two activation keys and a roller ball. Alternatively, other trackball arrangements may be used without departing from the principles of the present invention. Thus, the term "trackball" is used generically in this invention to refer to any mouse device or pointing mechanism that may be provided on or with a personal computer. In accordance with normal convention, the use of the trackball produces output signals on the mouse clock 41 and on data line 42 to the keyboard controller 50.

The keyboard 25 may comprise any suitable keyboard configuration. In the preferred embodiment, a compact keyboard arrangement is used to minimize the space required in the computer. According to the principles of the present invention, a function key is used in combination with a "T" key to disable/enable the trackball through a toggling arrangement. Thus, in the preferred embodiment, each time that the "function" key and the "T" key are simultaneously selected, the trackball 40 is alternatively enabled and disabled. Obviously other keys or combination of keys could be used without departing from the principles of the present invention. In the preferred embodiment, the keyboard 25, CPU 60, keyboard controller 50 and trackball 40 all are provided as pan of a portable personal computer.

Figure 3A:
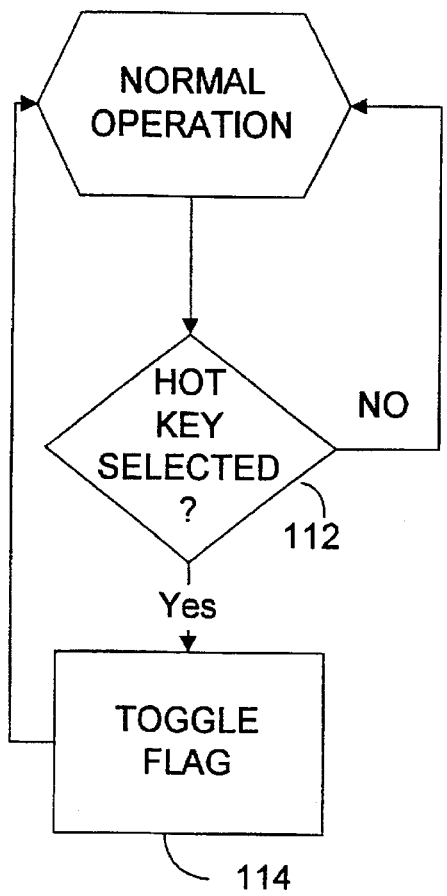
FIG. 3A–3B are flow charts illustrating system operation in the preferred embodiment of the present invention.
Figure 3B:
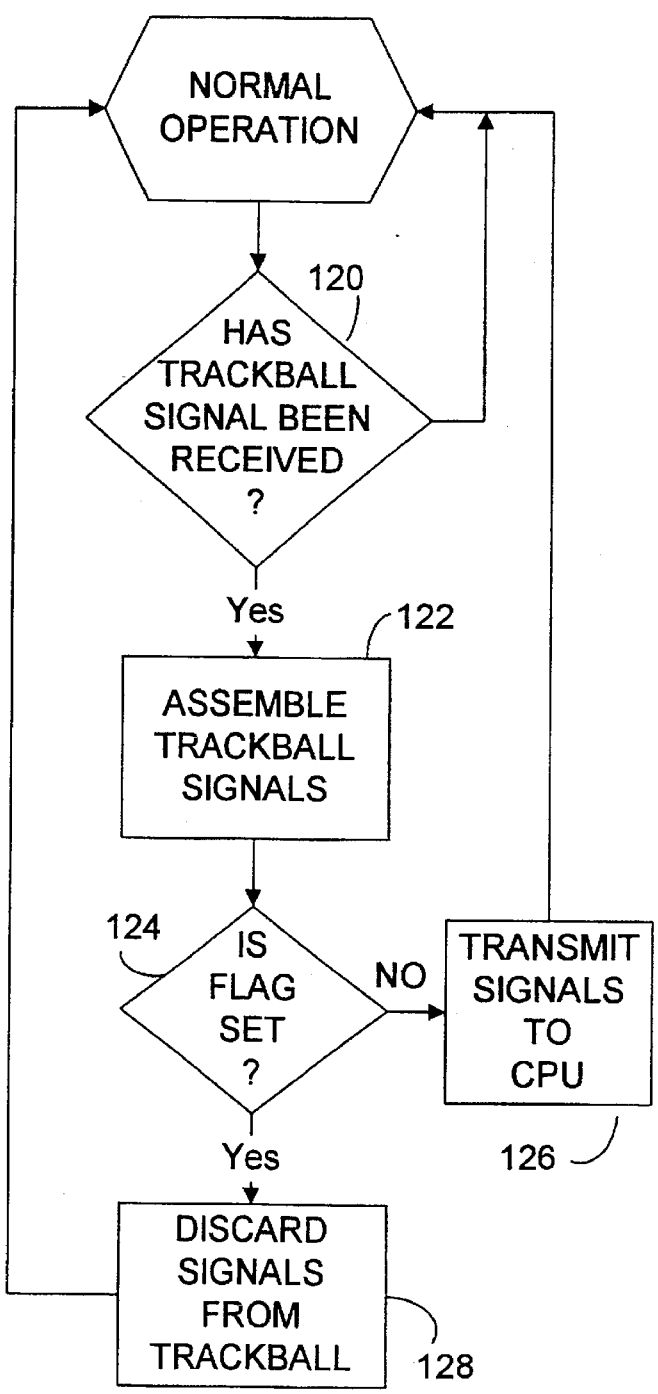

Referring now to FIGS. 2, 3A and 3B, the operation of the preferred embodiment of the present invention will now be described. The algorithms of FIGS. 3A and 3B preferably are performed simultaneously and continuously during system operation. Referring initially to FIG. 3A, the keyboard controller 50 performs its normal system operation until the hot key is selected on the keyboard 25 and detected by the keyboard controller in step 112. In response to hot key detection, the keyboard controller toggles the status of the flag 23 (step 114) to selectively enable or disable the trackball. Thus, as shown in FIG. 3A, the keyboard controller 50 sets a flag 23 to indicate if the trackball 40 is to be enabled or disabled.

Referring now to FIGS. 2 and 3B, the operation of which occurs concurrently with the operation shown in FIG. 3A, the keyboard controller 50 performs its normal operation until a signal is detected from the trackball on lines 41 and/or 42. If a signal is detected in step 120, the keyboard controller 50 performs its normal function of assembling the serial signals into a suitable 8-bit register (not shown) in step 122. Before the contents of the register are sent to the CPU 60 on bus 71, the keyboard controller 50 checks the status of the flag in step 124. If the flag has not been set (according to the operation of FIG. 3A), the keyboard controller 50 sends the signals to the CPU 60 on bus 71 (step 126). If, conversely, the flag is set to indicate that the trackball 50 has been disabled by the operation of FIG. 3A through the selection of the hot key, then the data in the data register is discarded in step 128, and the keyboard controller 50 returns to normal operation.

In this manner, the keyboard controller 50 monitors the signals from the keyboard 25 for the selection of the hot key (or key combination), and in response sets a flag to disable (or enable) the trackball 40. The status of the flag is toggled by selecting the hot key in the preferred embodiment. Obviously, two different keys could be used, one of which sets the disable flag, and one of which resets the flag to enable the trackball 40. When the trackball 40 is used by the operator, the keyboard controller 50 checks the status of the flag to determine if the flag is set. If the flag is set to indicate that the trackball 40 is disabled, the trackball data signals are discarded by the keyboard controller 50.

One particular advantage of the embodiment of FIGS. 2, 3A and 3B is that the trackball 40 remains connected to the controller 50 so that initialization signals can be received by the trackball during the start of a program or operating system. Only the output signals of the trackball 40 are selectively filtered in response to the selection of the hot key to prevent trackball signals from being transmitted to the CPU 60.

Figure 4:
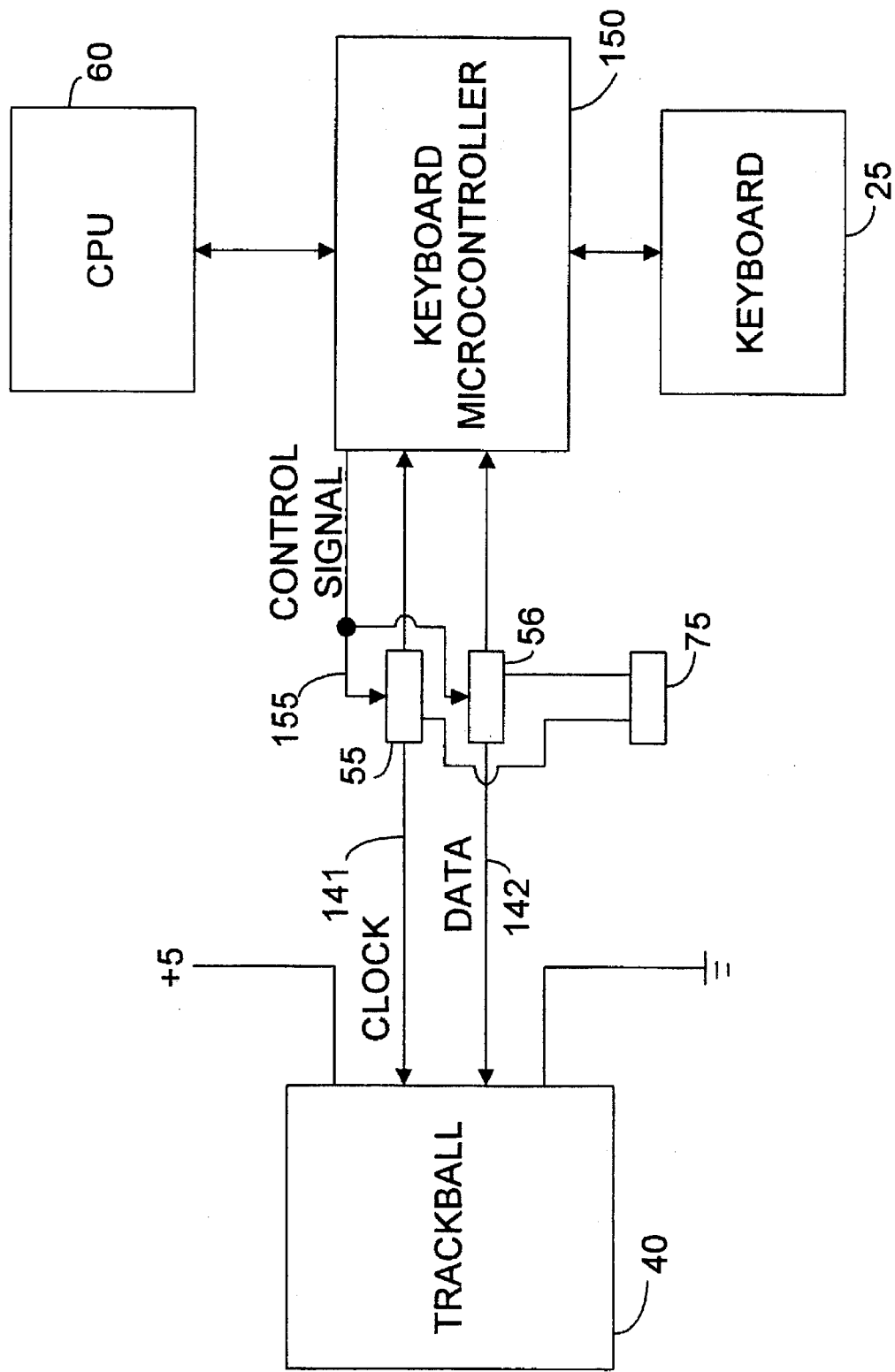
FIG. 4 is a schematic illustration of the system constructed in accordance with an alternative embodiment of the present invention.

Referring now to FIG. 4, an alternative embodiment of the invention will now be described. The same reference numbers have been used to refer to identical components. Thus, as shown in FIG. 4, the system includes a trackball 40, a CPU 60, a keyboard 25, a keyboard controller 150, and a pair of switches 55, 56 connected to an external mouse connector 75.

In this alternative embodiment, the switches 55, 56 connect to an external mouse connector 75 to permit the selection of an external mouse (which connects to connector 75). Thus, for example, if the portable computer is inserted in a docking station (not shown), the mouse associated with the docking station may be connected to the external mouse connector 75, and that mouse can be activated by control of switches 55, 56. The mouse clock 141 and mouse data 142 output lines connect to the keyboard controller 150 through switches 55, 56, respectively. The keyboard controller 150 controls the switches 55, 56 through a control signal output on line 155.

Figure 5:
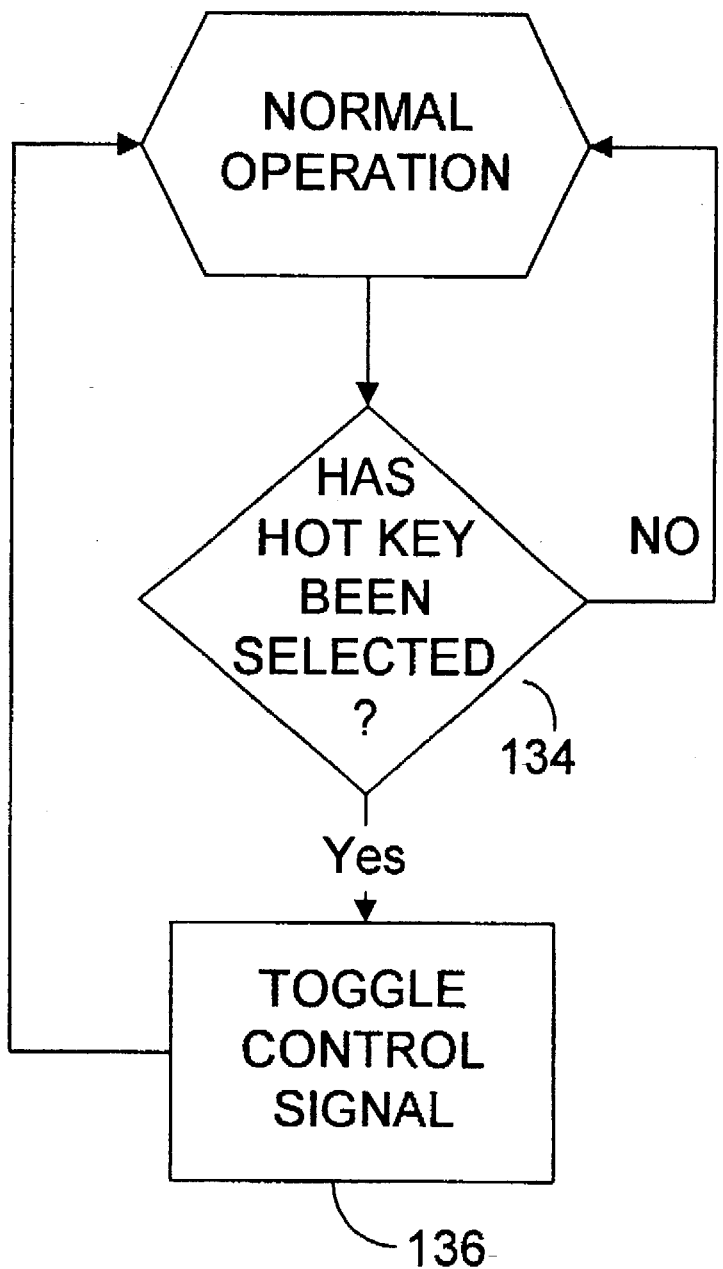
FIG. 5 is a flow chart illustrating system operation in accordance with the alternative embodiment of the present invention.

In the embodiment of FIG. 4, the keyboard controller 150 operates as shown in FIG. 5. Referring now to FIGS. 4 and 5, the keyboard controller 150 performs its normal operation until the hot key is selected on the keyboard to disable or enable the trackball. In response to the selection of the hot key in step 134, the keyboard controller 150 toggles the output signal on the control line 155 (between a digital "0" and "1") to change the connection of switches 55, 56 (step 136). Thus, for example, if the switches 55, 56 are set to connect the trackball output lines 141,142 to the keyboard controller 150, activation of the hot key will cause the keyboard controller 150 to change the signal on control line 155 (by, for example, applying a digital "1" on the control line), which will result in switches 55, 56 connecting the external mouse connector 75 to the keyboard controller 150, and effectively blocking the signals from the trackball 40. If the hot key is selected again, the keyboard controller 150 changes the status of control line 155 (by, for example, applying a digital "0" to the control line), causing the switches 55, 56 to connect the clock line 141 and data line 142 to the keyboard controller 150. In this fashion, the trackball 40 may be selectively enabled or disabled while in a software program or operating system.

While a preferred embodiment of the invention has been shown and described, modifications thereof can be made by one skilled in the art without departing from the spirit of the invention.

I claim:

1. A system for disabling or enabling a trackball for a portable computer, comprising:

a keyboard controller selectively coupled to the trackball through a switch for receiving signals therefrom and for generating signals indicative of trackball movement and wherein said switch also selectively couples said keyboard controller to a mouse;

a central processing unit coupled to said keyboard controller for receiving said signals indicative of either trackball or mouse movement;

an input device coupled to said keyboard controller for providing input signals to said keyboard controller, wherein said input device provides a coded signal to said keyboard controller to indicate that said trackball is to be disabled, and in response said keyboard controller prevents signals from said trackball from being received by said central processing unit, while permitting said central processing unit to receive input signals from said input device and said mouse.

2. A system as in claim 1, wherein said keyboard controller sets a flag in response to said coded signal from said input device.

3. A system as in claim 2, wherein said keyboard controller assembles from signals from said trackball before transmitting said trackball signals to said central processing unit.

4. A system as in claim 3, wherein said keyboard controller checks the status of said flag before transmitting said assembled signals to said central processing unit.

5. A system as in claim 4, wherein said assembled signals are filtered if said flag is set.

6. A system as in claim 5, wherein said keyboard controller does not transmit said assembled signals if said flag is set.

7. A system as in claim 3, wherein said keyboard controller transmits said assembled signals to the central processing unit if said flag is not set.

8. A system as in claim 1, wherein said input device comprises a keyboard.

9. A system as in claim 8, wherein said coded signal comprises a predetermined combination of keys.

10. A system as in claim 1, wherein a control line connects said keyboard controller to said switch.

11. A system as in claim 10, wherein said keyboard controller transmits a control signal to control the operation of said switch.

12. A system as in claim 10, wherein said keyboard controller, in response to said coded signal from said input device, transmits a control signal on said control line.

13. A system as in claim 12, wherein said control signal causes said switch to disconnect said trackball from said keyboard controller.

14. A system as in claim 12, wherein said control signal causes said switch to connect said trackball to said keyboard controller.

15. A system for enabling or disabling a first mouse device, comprising:

a keyboard controller selectively coupled to said first mouse device or to an external mouse device and receiving a signal from either said first mouse device or said external mouse device indicative of movement;

a keyboard coupled to said keyboard controller for transmitting to said keyboard controller an enable or disable signal said keyboard also providing to said keyboard controller input signals indicative of keys being depressed on said keyboard;

a CPU coupled to said keyboard controller;

said keyboard controller including an associated flag which is set or reset in response to said enable or disable signal from said keyboard;

wherein said keyboard controller discards said signal from said trackball indicative of trackball movement if said flag is set, while transmitting to said CPU input signals from said external mouse device.

16. A system as in claim 15, wherein successive signals from said keyboard toggle the flag between the set and the reset condition.

17. A system as in claim 16, wherein said signal from said first mouse device is transmitted to said CPU if said flag is reset.

18. A system as in claim 17, wherein the set condition is represented by a digital "0".

19. A system as in claim 18, wherein said set condition is represented by a digital "1".

20. A computer system, comprising:

a keyboard controller selectively coupled to a first mouse or a second mouse through a switch;

a central processing unit coupled to said keyboard controller, said central processing unit receiving signals from either said first mouse or said second mouse;

a keyboard coupled to said keyboard controller for providing input signals to said keyboard controller, and wherein one of the input signals provided by said keyboard determines which mouse connects to said keyboard controller.

21. A system as in claim 20, wherein said keyboard controller, in response to said one of the input signals from said keyboard, changes position of said switch to connect one or the other of said first mouse or said second mouse to said keyboard controller.

22. A system as in claim 20, wherein said switch comprises a pair of switches which operate in tandem.

23. A system for disabling or enabling a trackball for a portable computer, comprising:

a keyboard controller selectively coupled to the trackball through a switch for receiving signals therefrom and for generating signals indicative of trackball movement, and wherein said keyboard controller couples to said switch through a control line to control the position of said switch;

a central processing unit coupled to said keyboard controller for receiving said signals indicative of trackball movement;

a keyboard coupled to said keyboard controller for providing input signals to said keyboard controller;

wherein said keyboard provides a coded signal to said keyboard controller to indicate that said trackball is to be disabled, and in response said keyboard controller prevents signals from said trackball from being received by said central processing unit by changing the position of said switch, while permitting said central processing unit to continue to receive input dignals from said keyboard.

* * * * *